United States Patent
Cheng (10) Patent No.: US 10,637,975 B2
(45) Date of Patent: Apr. 28, 2020

(54) ELECTRONIC APPARATUS AND METHOD FOR CONTROLLING ELECTRONIC APPARATUS

(71) Applicant: Guangdong Oppo Mobile Telecommunications Corp., Ltd., Dongguan, Guangdong (CN)

(72) Inventor: Jiao Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/509,442

(22) Filed: Jul. 11, 2019

(65) Prior Publication Data
US 2020/0021675 A1 Jan. 16, 2020

(30) Foreign Application Priority Data

Jul. 13, 2018 (CN) .......................... 2018 1 0772535

(51) Int. Cl.
*H04M 1/02* (2006.01)
*G08B 3/10* (2006.01)
(Continued)

(52) U.S. Cl.
CPC ............ *H04M 1/0245* (2013.01); *G08B 3/10* (2013.01); *G08B 6/00* (2013.01); *G08B 7/06* (2013.01);
(Continued)

(58) Field of Classification Search
CPC . H04M 1/0247; H04M 1/0268; H04W 84/18; H04W 12/0608
See application file for complete search history.

(56) References Cited

U.S. PATENT DOCUMENTS

2014/0049463 A1 2/2014 Seo et al.
2015/0062025 A1 3/2015 Lee et al.
(Continued)

FOREIGN PATENT DOCUMENTS

CN 105549690 B 1/2018
CN 107885636 A 4/2018
(Continued)

OTHER PUBLICATIONS

International search report issued in corresponding international application No. PCT/CN2019/093844 dated Sep. 27, 2019.
(Continued)

*Primary Examiner* — Diane D Mizrahi
(74) *Attorney, Agent, or Firm* — Young Basile Hanlon & MacFarlane, P.C.

(57) ABSTRACT

An electronic apparatus is provided. The electronic apparatus includes a casing including a first shell and a second shell rotatably attached to the first shell, a sensor configured to sense an actual angle defined between the first shell and the second shell, a processor electrically coupled to the sensor and configured to compare the actual angle with a target angle, and a first reminding device electrically coupled to the processor. The processor is further configured to control the first reminding device to output a first reminding information in response to that the actual angle is equal to the target angle. A method for controlling an electronic apparatus is also provided.

20 Claims, 8 Drawing Sheets

(51) Int. Cl.
    *G08B 6/00*     (2006.01)
    *G08B 7/06*     (2006.01)
    *G08B 21/24*    (2006.01)
    *H04M 1/03*     (2006.01)
(52) U.S. Cl.
    CPC .......... *G08B 21/24* (2013.01); *H04M 1/0216* (2013.01); *H04M 1/03* (2013.01); *H04M 2250/16* (2013.01)

(56) References Cited

U.S. PATENT DOCUMENTS

| | | |
|---|---|---|
| 2016/0034047 A1 | 2/2016 | Lee et al. |
| 2017/0228021 A1 | 8/2017 | Xu |
| 2018/0039387 A1* | 2/2018 | Cheong ............... G06F 3/04883 |
| 2018/0242446 A1* | 8/2018 | Cho ..................... H05K 1/0281 |

FOREIGN PATENT DOCUMENTS

| | | |
|---|---|---|
| CN | 108182135 A | 6/2018 |
| CN | 108227996 A | 6/2018 |
| EP | 2977850 A1 | 1/2016 |
| EP | 2998851 A1 | 3/2016 |
| WO | 2016117804 A1 | 7/2016 |

OTHER PUBLICATIONS

Extended European search report issued in corresponding European application No. 19184291.3 dated Nov. 25, 2019.

* cited by examiner

ELECTRONIC APPARATUS AND METHOD FOR CONTROLLING ELECTRONIC APPARATUS

CROSS-REFERENCE TO RELATED APPLICATION(S)

The present disclosure claims priority to Chinese Patent Application No. 201810772535.9, filed on Jul. 13, 2018, which is hereby incorporated by reference in its entirety.

TECHNICAL FIELD

The present disclosure relates to the field of electronic apparatus, and more particularly to an electronic apparatus and a method for controlling the electronic apparatus.

BACKGROUND

Electronic apparatuses, such as mobile phones, have become an indispensable part of people's lives. Mobile phones are not only used for communication but also for entertainment. The mobile phone may realize various functions with the screen thereof getting bigger and bigger. E.g., a mobile phone with a foldable screen not only provides a large screen to meet the entertainment requirements, but also improves the portability of the mobile phone.

SUMMARY

An electronic apparatus is provided. The electronic apparatus includes a casing including a first shell and a second shell rotatably connected to the first shell, a sensor configured to sense an actual angle between the first shell and the second shell, a processor electrically coupled to the sensor and configured to compare the actual angle with a target angle, and a first reminding device electrically coupled to the processor. The processor is configured to control the first reminding device to output a first reminding information in response to that the actual angle is equal to the target angle.

An electronic apparatus is further provided. The electronic apparatus includes a first shell, a second shell, a sensor, a reminding device, and a processor electrically coupled to the sensor and the reminding device. The processor is configured to determine a current state of the electronic apparatus according to sensing data from the sensor. The processor is further configured to output a reminding information in response to that the current state of the electronic apparatus is one of a first state and a second state. In the first state, the first shell and the second shell overlap with each other. In the second state, the first shell is unfolded relative to the second shell.

A method for controlling an electronic apparatus is also provided. The electronic apparatus includes a casing including a first shell and a second shell rotatably attached to the first shell. The method includes: sensing an actual angle defined between the first shell and the second shell; comparing the actual angle with a target angle; and outputting a first reminding information in response to that the actual angle is equal to the target angle.

BRIEF DESCRIPTION OF DRAWINGS

To better illustrate the technical solutions of embodiments of the present disclosure, the following descriptions will briefly illustrate the accompanying drawings described in the illustrated embodiments. Obviously, the following described accompanying drawings are merely some embodiments of the present disclosure. Those skilled in the art may obtain other accompanying drawings according to the described accompanying drawings without creative efforts.

DETAILED DESCRIPTION

Technical solutions of embodiments of the present disclosure will be described clearly and completely in combination with the accompanying drawings of the embodiments of the present disclosure. Obviously, the described embodiments are merely a part rather than all of embodiments of the present disclosure. All other embodiments obtained by those skilled in the art without creative efforts based on the embodiments of the present disclosure shall fall within the protection scope of the present disclosure.

The present disclosure relates to an electronic apparatus. The electronic apparatus includes a casing including a first shell and a second shell rotatably connected to the first shell, a sensor configured to sense an actual angle between the first shell and the second shell, a processor electrically coupled to the sensor and configured to compare the actual angle with a target angle, and a first reminding device electrically coupled to the processor. The processor is configured to control the first reminding device to output a first reminding information in response to that the actual angle is equal to the target angle.

In at least one embodiment, the sensor is a distance sensor including a transmitting module disposed at the first shell and a receiving module disposed at the second shell.

In at least one embodiment, the first reminding device is a vibrating device.

In at least one embodiment, the processor is further configured to detect a remaining battery capacity of the electronic apparatus. The processor is further configured to control the first reminding device to vibrate with a first vibration amplitude to output the first reminding information in response to that the remaining battery capacity is higher than a threshold. The processor is further configured to control the first reminding device to vibrate with a second vibration amplitude to output the first reminding information in response to that the remaining battery capacity is lower than the threshold. The first vibration amplitude is greater than the second vibration amplitude.

In at least one embodiment, the processor is further configured to detect a remaining battery capacity of the electronic apparatus. The processor is further configured to control the first reminding device to vibrate at a first vibration frequency to output the first reminding information in response to that the remaining battery capacity is higher than a threshold. The processor is further configured to control the first reminding device to vibrate a second vibration frequency to output the first reminding information in response to that the remaining battery capacity is lower than the threshold. The first vibration amplitude is greater than the second vibration amplitude.

In at least one embodiment, the target angle includes a first angle defined between the first shell and the second shell when the first shell is unfolded relative to the second shell, and a second angle defined between the first shell and the second shell when the first shell and the second shell overlap with each other. The processor is configured to control the first reminding device to vibrate with a first vibration amplitude to output the first reminding information in response to that the actual angle equals the target angle. The processor is further configured to control the first reminding device to vibrate with a second vibration amplitude in response to that the actual angle is larger than the first angle or smaller than the second angle. The first vibration amplitude is less than the second vibration amplitude.

In at least one embodiment, the target angle includes a first angle defined between the first shell and the second shell when the first shell is unfolded relative to the second shell, and a second angle defined between the first shell and the second shell when the first shell and the second shell overlap with each other. The processor is further configured to control the first reminding device to vibrate at a first vibration frequency to output the first reminding information in response to that the actual angle is equal to the first angle or the second angle. The processor is further configured to control the first reminding device to vibrate at a second vibration frequency in response to that the actual angle is greater than the first angle or less than the second angle. The first vibration frequency is less than the second vibration frequency.

In at least one embodiment, the electronic apparatus includes a second reminding device. The processor is further configured to control the second reminding device to output a second reminding information in response to that the actual angle is equal to the target angle.

In at least one embodiment, the second reminding device is a sounding device. The electronic apparatus further includes a detecting device configured to detect an ambient volume. The processor is configured to control the second reminding device to output sounds at a first volume to output the second reminding information in response to that the ambient volume is higher than a threshold. The processor is further configured to control the second reminding device to output sounds at a second volume to output the second reminding information in response to that the ambient volume is lower than the threshold. The first volume is higher than the second volume.

In at least one embodiment, the electronic apparatus further includes a first display screen and a second display screen. The first display screen includes a first portion and a second portion. The first shell has a first surface and a second surface opposite the first surface. The first portion is disposed at the first surface of the first shell and the second display screen is disposed at the second surface of the first shell. The second portion is disposed at the second shell. The first portion and the second portion are located at the same side of the casing when the first shell is unfolded relative to the second shell. The first display screen is located between the first shell and the second shell and the first portion faces the second portion when the first shell and the second shell overlap with each other.

In at least one embodiment, the target angle includes 180° and 0°. The processor is further configured to control to the first display screen to be turned on and the second display screen to be turned off in response to that the actual angle equals 180°. The processor is further configured to control the first display screen to be turned off and the second display screen to be turned on, in response to that the actual angle equals 0°.

The present disclosure further relates to an electronic apparatus. The electronic apparatus includes a first shell, a second shell, a sensor, a reminding device, and a processor electrically coupled to the sensor and the reminding device. The processor is configured to determine a current state of the electronic apparatus according to sensing data from the sensor. The processor is further configured to output a reminding information in response to that the current state of the electronic apparatus is one of a first state and a second state. In the first state, the first shell and the second shell overlap with each other. In the second state, the first shell is unfolded relative to the second shell.

The present disclosure further relates to a method for controlling an electronic apparatus. The electronic apparatus includes a casing including a first shell and a second shell rotatably attached to the first shell. The method includes: sensing an actual angle defined between the first shell and the second shell; comparing the actual angle with a target angle; and outputting a first reminding information in response to that the actual angle is equal to the target angle.

Figure 1:
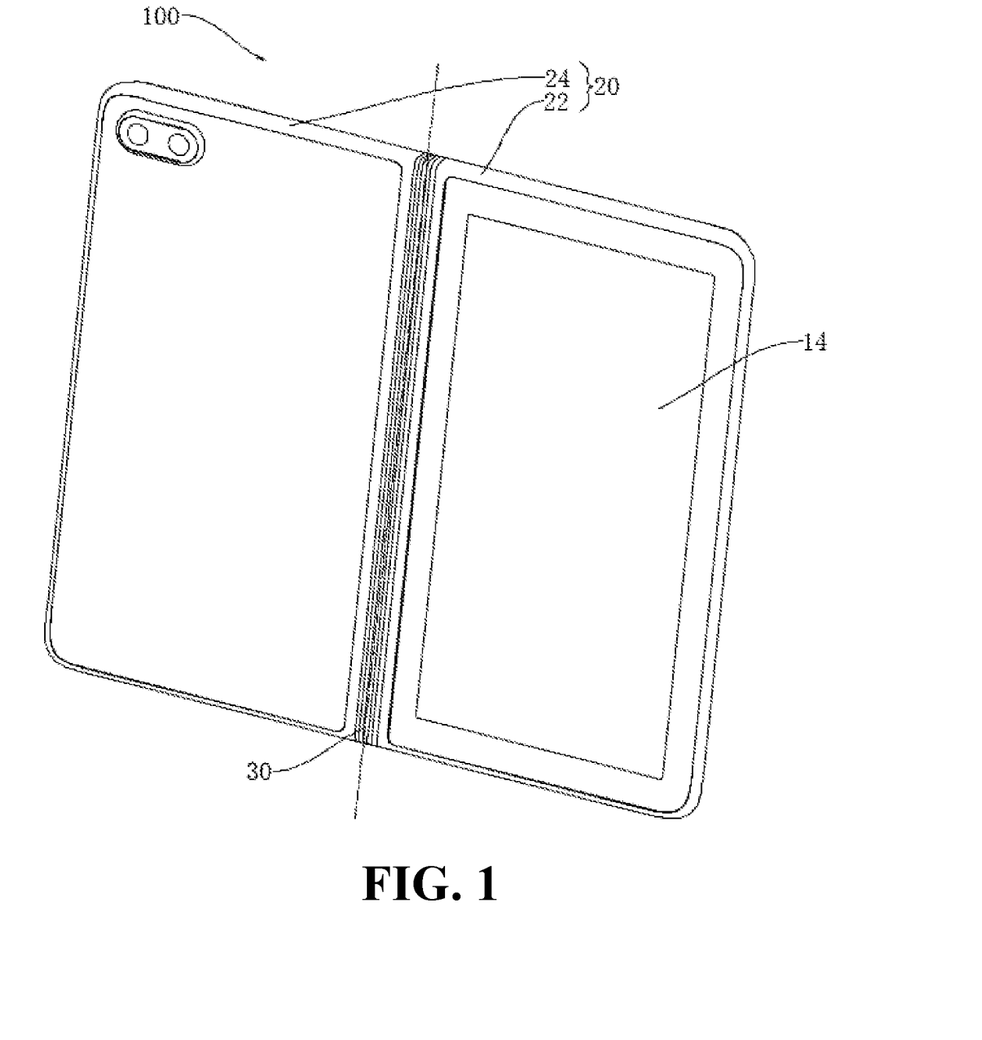
FIG. 1 is a perspective view of an electronic apparatus according to a first embodiment of the present disclosure, illustrating the electronic apparatus being in an unfolded state.
Figure 2:
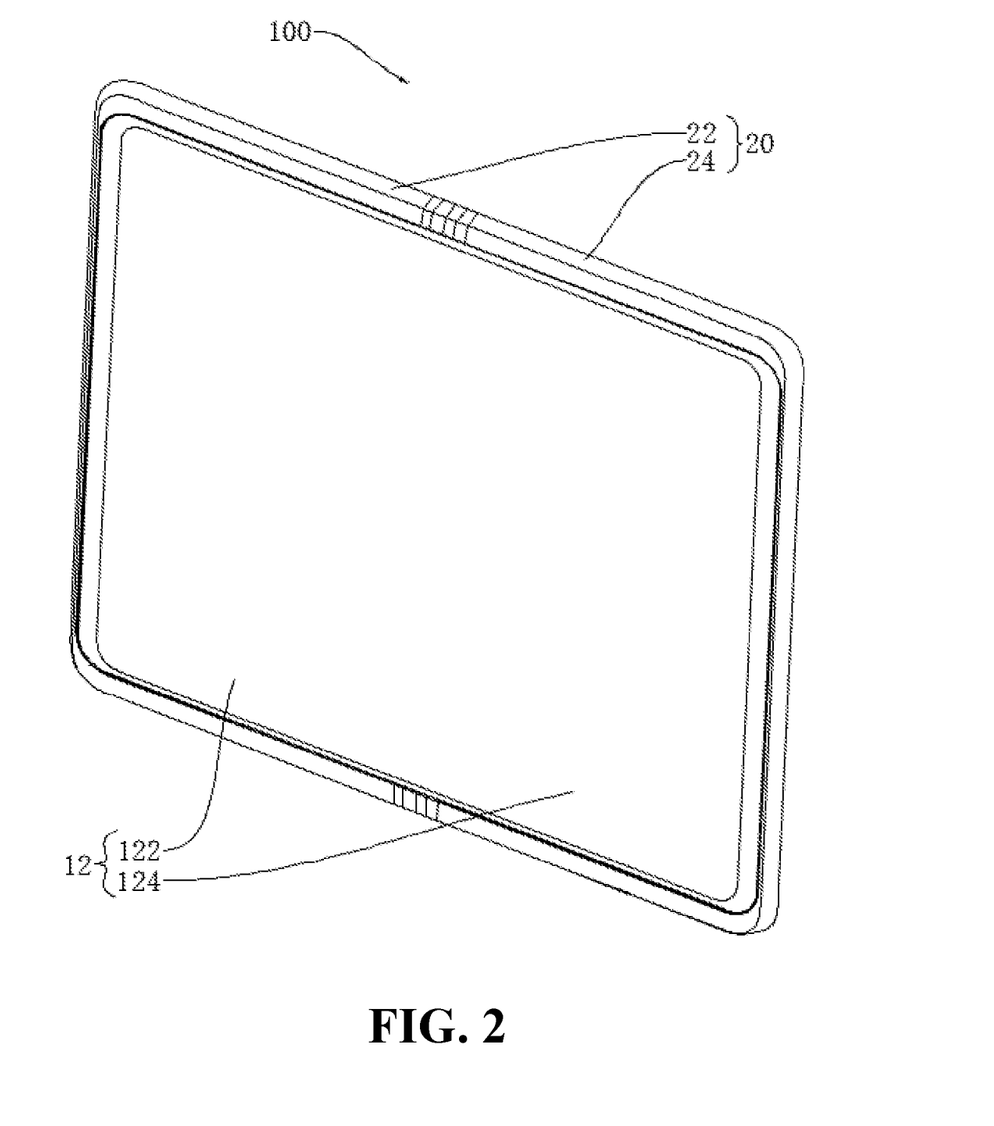
FIG. 2 is another perspective view of an electronic apparatus according to a first embodiment of the present disclosure, illustrating the electronic apparatus being in an unfolded state.
Figure 3:
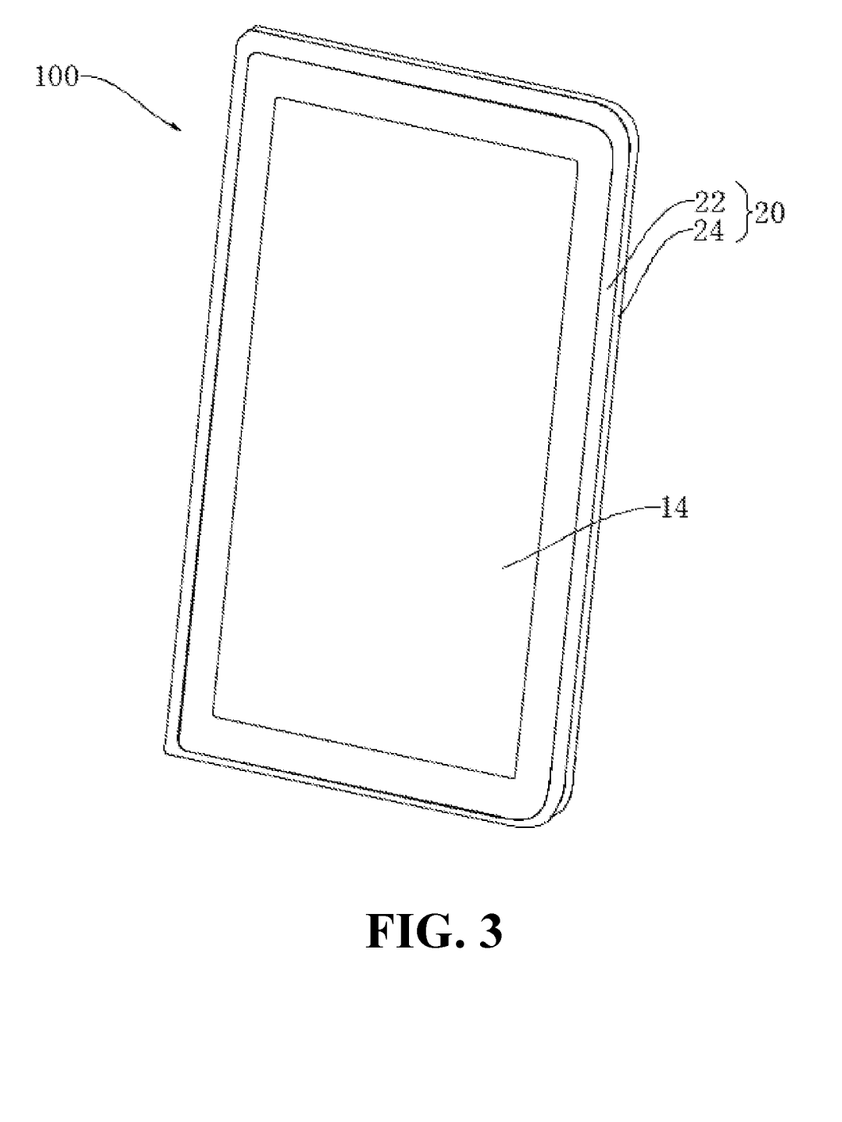
FIG. 3 is a perspective view of an electronic apparatus according to a first embodiment of the present disclosure, illustrating the electronic apparatus being in a folded state.

As illustrated in FIG. 1, FIG. 2, and FIG. 3, an electronic apparatus 100 according to a first embodiment of the present disclosure includes, but is not limited to, a mobile phone, a tablet computer, a notebook computer, and the like. In the embodiment, the electronic apparatus 100 includes a first display screen 12, a second display screen 14, a casing 20, a sensor 40, and a first reminding device 50. As illustrate in FIG. 8, the electronic apparatus 100 further includes a processor 70. The processor 70 is electrically coupled to the sensor 40, the first display screen 12, the second display screen 14, and the first reminding device 50. The first reminding device 50 may be a vibrating device configured to remind a user that the electronic apparatus 100 has been rotated in place by vibrating. The processor 70 may be electronic components such as a chip integrated on a main board of the electronic apparatus. The first display screen 12 is a flexible display screen, such as an organic light emitting diode (OLED) display panel. The OLED display panel has the characteristics of flexible bending, high contrast, thin thickness, wide viewing angle, fast reaction speed, wide temperature range, simple structure, and simple process. The second display screen 14 is an OLED display panel or a thin film transistor liquid crystal display panel.

Figure 4:
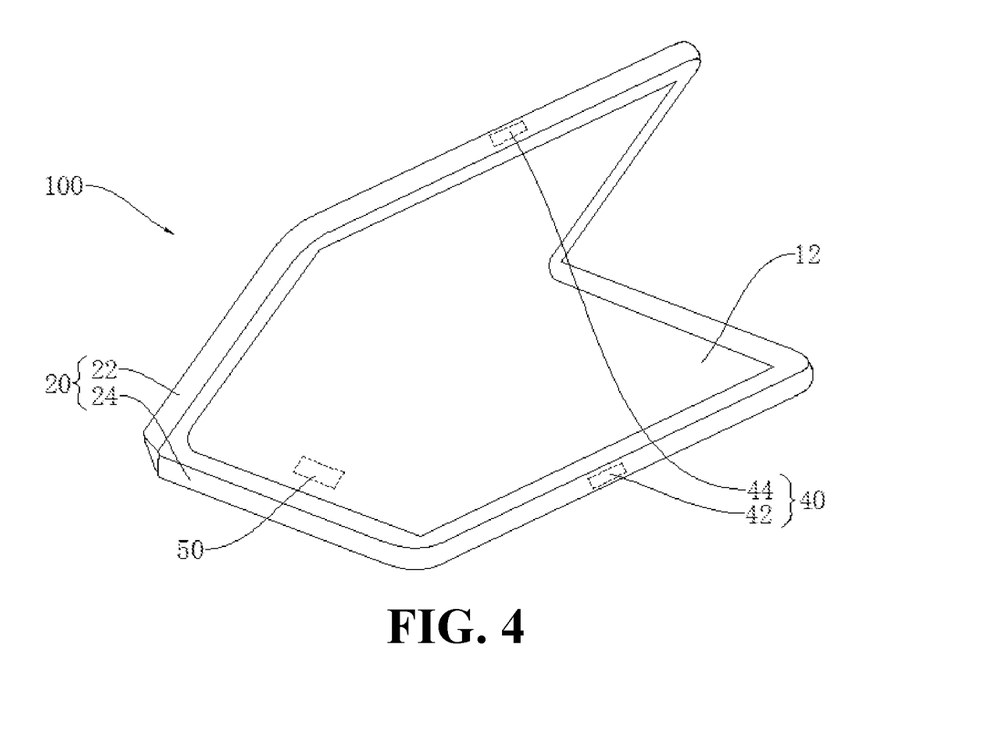
FIG. 4 is a schematic view of an electronic apparatus according to a first embodiment of the present disclosure, illustrating the electronic apparatus being during the process of rotation.

As illustrated in FIG. 2 and FIG. 4, in the embodiment, the first display screen 12 includes a first portion 122 and a second portion 124. The first portion 122 is coupled with the second portion 124. In one embodiment, the first portion 122 and the second portion 124 are the same in shape and size. It should be understood that, the first portion 122 and the second portion 124 are symmetrical with respect to a center line of the first display screen 12. In the embodiment, the center line may be a vertical center line of the first display screen 12. In the embodiment, both the first portion 122 and the second portion 124 are part of the first display screen 12 and may display information. The first portion 122 and the second portion 124 may cooperatively display to allow the first display screen 12 to display a complete image. For example, the first portion 122 and the second portion 124 cooperatively display a complete image on the first display screen 12 when playing a movie in a full screen mode. Alternatively, the first portion 122 and the second portion 124 may display individual images. For example, in a split screen display mode, the first portion 122 may display a video and the second portion 124 may display an application interface.

In the embodiment, the casing 20 includes a first shell 22, a second shell 24, and a rotating device 30 disposed between the first shell 22 and the second shell 24. The second shell 24 is rotatable relative to the first shell 22 via the rotating device 30 to switch the electronic apparatus 100 between an unfolded state in which the first shell 22 and the second shell 24 overlap with each other and a folded state in which the first shell 22 is unfolded relative to the second shell 24. As illustrated in FIG. 4, the electronic apparatus 100 is in a state transiting from the folded state to the unfolded state or transiting from the unfolded state to the folded state. The first shell 22 and the second shell 24 are made of metal or non-metal materials and both are hollow structures. The first shell 22 and the second shell 24 are configured to receive electronic components therein, such as a circuit board, a battery, and the like. On the one hand, the casing 20 receives the electronic components therein to form the electronic apparatus 100. On the other hand, the casing 20 may protect the electronic components disposed therein against moisture and water. The rotating device 30 may be a transmission module including one or more transmission components, such as a rotating shaft and a gear. In other embodiments, the rotating device 30 may also be made of a flexible and bendable material that is bendable.

Figure 5:
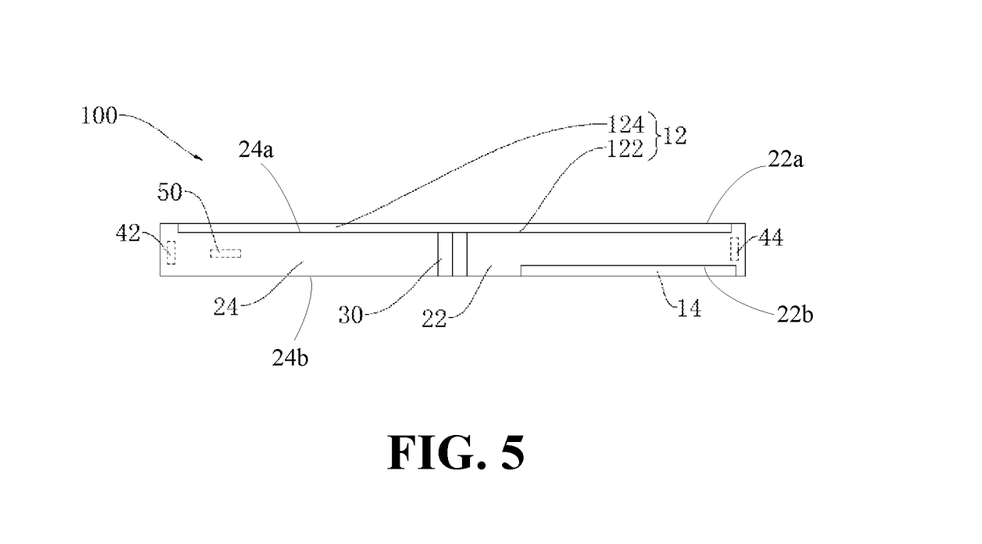
FIG. 5 is a schematic structural view of an electronic apparatus according to a first embodiment of the present disclosure, illustrating the electronic apparatus being in an unfolded state.
Figure 6:
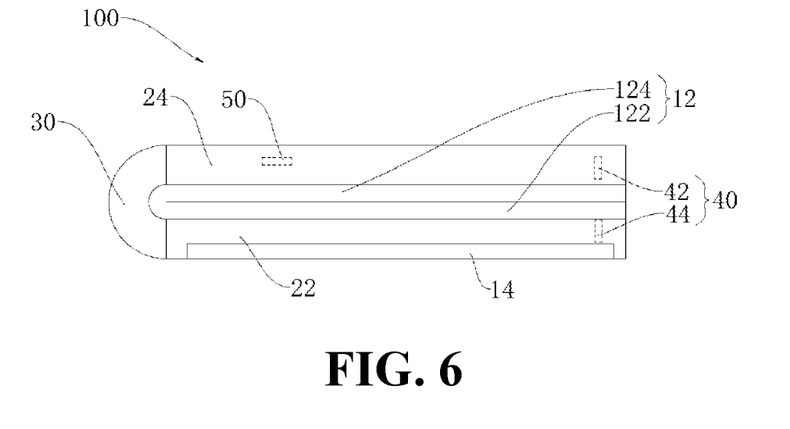
FIG. 6 is a schematic structural view of an electronic apparatus according to a first embodiment of the present disclosure, illustrating the electronic apparatus being in a folded state.

As illustrated in FIG. 5 and FIG. 6, the first shell 22 includes a first surface 22a and a second surface 22b opposite the first surface 22a. The second shell 24 includes a first surface 24a and a second surface opposite the first surface 24a. The first portion 122 of the first display screen 12 is disposed at the first surface 22a of the first shell 22 and the second display screen 14 are disposed at the second surface 22b the first shell 22. The second portion 124 of the first display screen 12 is disposed at the second surface 22b of the second shell 24. When the electronic apparatus 100 is in the unfolded state, the first portion 122 and the second portion 124 are located on the same side of the casing 20.

The casing 20 includes an inner side and an outer side. When the first shell 22 is unfolded relative to the second shell 24, the inner side and the outer side are two opposite sides of the casing 20. As illustrated in FIG. 6, when the first shell 22 is folded relative to the second shell 24, the first surface 22a of the first shell 22 facing the second shell 24 and the first surface 24a of the second shell 24 facing the first shell 22 form the inner side of the casing 20 located between the first shell 22 and the second shell 24. The second surface 22b of the first shell 22 and the second surface 24b of the second shell 24 form the outer side of the casing 20 located outside the first shell 22 and the second shell 24. In the embodiment, the first display screen 12 is located at the inner side, and the second display screen 14 is located on the outer side. The first portion 122 and the second portion 124 of the first display screen 12 are rotated relative to each other along with the rotation of the first shell 22 and the second shell 24 relative to each other.

When the electronic apparatus 100 is in the folded state, the first display screen 12 is in an unfolded state. In one embodiment, when the first display screen 12 is in an unfolded state, that is, the first display screen 12 is flat, an actual angle defined between the first shell 22 and the second shell 24 is 180°. At this time, the first portion 122 and the second portion 124 of the first display screen 12 are coplanar. The first display screen 12 may form a complete display screen. When the electronic apparatus 100 is in the folded state, the first display screen 12 is in a folded state, and the actual angle defined between the first shell 22 and the second shell 24 is 0°. At this time, the first portion 122 and the second portion 124 of the first display screen 12 are stacked or overlapped.

As illustrated in FIG. 4, the sensor 40 is disposed at the casing 20 and configured to detect the actual angle defined between the first shell 22 and the second shell 24 by detecting a positional relationship between the first shell 22 and the second shell 24. The sensor 40 is a distance sensor and includes a transmitting module 42 and a receiving module 44. The transmitting module 42 is disposed at the first shell 22, and the receiving module 44 is disposed at the second shell 24. The transmitting module 42 is configured to emit infrared rays or ultrasonic waves and the receiving module 44 is configured to receive infrared the rays or ultrasonic waves transmitted by the transmitting module 42. The processor 70 is configured to calculate the actual angle defined between the first shell 22 and the second shell 24 according to a time from transmitting the infrared rays or ultrasonic waves by the transmitting module 42 to receiving the infrared rays or ultrasonic waves by the receiving module 44 by the time-of-flight method.

The first reminding device 50 is disposed at the casing 20 and configured to output a first reminding information when the actual angle defined between the first shell 22 and the second shell 24 is equal to a target angle.

The number of the first reminding device 50 may be one or multiple. When the number of the first reminding devices 50 is one, the first reminding device 50 is disposed at the first shell 22 or the second shell 24. When the number of the first reminding devices 50 is multiple, all the first reminding devices 50 may be disposed at the first shell 22 or the second shell 24, or some first reminding devices 50 may be disposed at the first shell 22 and some first reminding devices 50 may be disposed at the second shell 24.

The first reminding device 50 may be a linear motor which drives a slider to reciprocate on a slide rail to generate vibrations with a good vibration effect. After the sensor 40 senses the actual angle defined between the first shell 22 and the second shell 24, the processor 70 compares the actual angle with the target angle. When the actual angle is equal to the target angle, the processor 70 controls the first reminding device 50 to vibrate. When the actual angle is not equal to the target angle, the first reminding device 50 does not vibrate.

The target angle may be preset by the user corresponding to the operating states of the electronic apparatus 100 to remind the user that the electronic apparatus 100 enters the corresponding operating state.

Alternatively, the target angle each may also be set to be a range of a value to reduce an impact of an error of the actual angle sensed by the sensor 40.

Alternatively, in other embodiments, the first reminding device 50 may also be a sounding device or a light emitting device and the first reminding information may be a sound or a light and the like.

As illustrated in FIG. 2 and FIG. 5, when the electronic apparatus is in the unfolded state, that is, when the first shell 22 is rotated unfolded relative to the second shell 24, the angle between the first shell 22 and the second shell 24 is 180°. At this time, the first display screen 12 displays for the electronic apparatus 100 and the target angle may be set to 180°. When the user unfolds the electronic apparatus 100 to cause the actual angle defined between the first shell 22 and the second shell 24 to be 180°, that is, equals to the first angle, the first reminding device 50 outputs the first reminding information to remind the user that the electronic apparatus 100 is in the unfolded state.

As illustrated in FIG. 3 and FIG. 6, when the electronic apparatus is in the folded state, that is, when the first shell 22 overlap with the second shell 24, the actual angle defined between the first shell 22 and the second shell 24 is 0°. At this time, the second display screen 14 displays for the electronic apparatus 100 and the target angle is set to 0°. When the user folds the electronic apparatus 100 to cause the actual angle defined between the first shell 22 and the second shell 24 to be 0°, that is, equals to the second angle, the first reminding device 50 outputs the first reminding information to remind the user that the electronic apparatus 100 is in the folded state. In the embodiment, when the actual angle defined between the first shell 22 and the second shell 24 is equal to the first angle or the second angle, the first reminding device 50 may remind the user in the same or a different manner. For example, when the actual angle is equal to the first angle or the target angle, the first reminding device 50 may vibrate at the same or different vibration frequency, or with the same or different vibration amplitude.

When the actual angle defined between the first shell 22 and the second shell 24 equals to the target angle (e.g., 0° or 180°), the first reminding device 50 outputs the first reminding information to remind the user that electronic apparatus 100 has been rotated in place, which optimizes the interaction between the electronic apparatus 100 and the user, improves the user experience, and avoids the user excessively rotating the electronic apparatus 100 to damage the electronic apparatus 100, and prolongs the life of the electronic apparatus 100.

Figure 8:
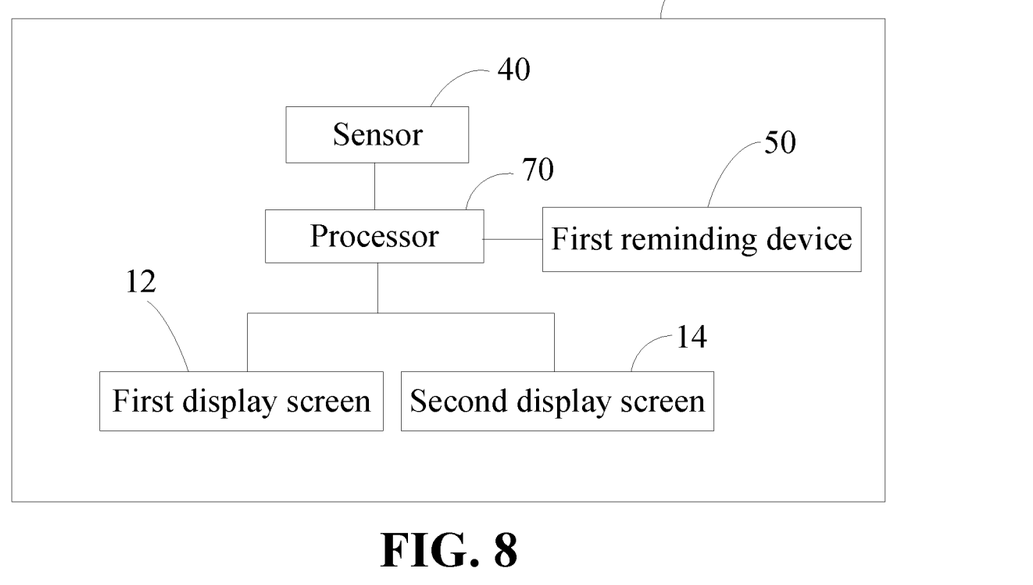
FIG. 8 is a schematic block diagram of an electronic apparatus according to a first embodiment of the present disclosure.

As illustrated in FIG. 8, when the actual angle is equal to the first angle, the processor 70 is further configured to control the first display screen 12 to be turned on to display information and the second display screen 14 to be turned off. When the actual angle is equal to the second angle, the processor 70 is further configured to control the second display screen 14 to be turned on to display information and the first display screen 12 to be turned off. When the actual angle is equal to the first angle, that is, the electronic apparatus 100 is in the unfolded state, the first display screen 12 displays for the electronic apparatus 100 and the second display screen 14 may be turned off to save power. When the actual angle is equal to the second angle, that is, the electronic apparatus 100 is in the folded state and the first shell 22 overlaps with the second shell 24, the second display 14 displays for the electronic apparatus 100 and the first display 12 may be turned off to save power.

The processor 70 is further configured to detect a battery capacity of the electronic apparatus 100.

When the battery capacity is higher than a threshold, the first reminding device 50 vibrates with a first vibration amplitude. When the battery capacity is lower than the threshold, the first reminding device 50 is configured to vibrate with a second vibration amplitude. The first vibration amplitude is greater than the second vibration amplitude. The power consumed by the first reminding device 50 vibrating with the first vibration amplitude is greater than the power consumed by the first reminding device 50 vibrating with the second vibration amplitude. When the power of the electronic apparatus 100 is sufficient, the first reminding device 50 vibrates with a large vibration amplitude to obtain a better reminding effect. When the power of the electronic apparatus 100 is insufficient, the first reminding device 50 vibrates with a small vibration amplitude to save power and extend standby time. In one embodiment, the threshold may be 30% of the sufficient power of the electronic apparatus 100.

In another embodiment, when the battery capacity is higher than the threshold, the first reminding device 50 is configured to vibrate at a first vibration frequency. When the battery capacity is lower than the threshold, the first reminding device 50 is configured to vibrate at a second vibration frequency. The first vibration frequency is greater than the second vibration frequency. The power consumed by the first reminding device 50 vibrating at the first vibration frequency is greater than the power consumed by the first reminding device 50 vibrating at the second vibration frequency. When the power of the electronic apparatus 100 is sufficient, the first reminding device 50 vibrates at a relatively high vibration frequency to obtain a better reminding effect. When the power of the electronic apparatus 100 is insufficient, the first reminding device 50 vibrates at a relatively low vibration frequency to save power and extend standby time.

The target angle includes a first angle defined between the first shell 22 and the second shell 24 when the first shell 22 is unfolded relative to the second shell 24, and a second angle defined between the first shell 22 and the second shell 24 when the first shell 22 and the second shell 24 overlap with each other. In one embodiment, the first angle may be 180° corresponding to the unfolded state of the electronic apparatus 100 and the second target angle may be 0° corresponding to the folded state of the electronic apparatus 100.

When the actual angle is equal to the first angle or the second angle, the processor 70 is configured to control the first reminding device 50 to vibrate with a third vibration amplitude. When the actual angle is greater than the first angle or less than the second angle, the processor is configured to control the first reminding device 50 to vibrate at a fourth vibration amplitude. The third vibration amplitude is less than the fourth vibration amplitude. The first reminding device 50 may generate a stronger vibration, that is, a stronger reminding effect, vibrating with the fourth vibration amplitude than the third vibration amplitude. Specific application scenarios include, but are not limited to, the following. The first shell 22 and the second shell 24 are rotated relative to each other to unfold the electronic apparatus 100 and the first display screen 12 may display information.

When the actual angle equal to the first threshold angle (i.e., 180°, the first reminding device 50 vibrates with the third vibration amplitude to remind the user that the electronic apparatus 100 has rotated 180° to be in the folded state. When the electronic apparatus 100 is further forcefully rotated to cause the actual angle to be greater than 180°, the first reminding device 50 vibrates with the fourth vibration amplitude to remind the user to stop rotating the electronic apparatus 100 in a more intense manner, thereby avoiding damaging the electronic apparatus 100 and protect the electronic apparatus 100.

In another embodiment, when the actual angle is equal to the first angle or the second angle, the processor 70 is configured to control the first reminding device 50 to vibrate at a third vibration frequency. When the actual angle is greater than the first angle or less than the angle, the processor is configured to control the first reminding device 50 to vibrate at a fourth vibration frequency. The third vibration frequency is less than the fourth vibration frequency. The first reminding device 50 may generate a stronger vibration, that is, a stronger reminding effect, vibrating at the fourth vibration frequency than the third vibration frequency. Specific application scenarios include, but are not limited to, the following. The first shell 22 and the second shell 24 are rotated relative to each other to unfold the electronic apparatus 100 and the first display screen 12 may display information. When the actual angle equal to the first angle (i.e., 180°, the first reminding device 50 vibrates at the third vibration frequency to remind the user that the electronic apparatus 100 is in the folded state. When the electronic apparatus 100 is further rotated to cause the actual angle to be greater than 180°, the first reminding device 50 vibrates at the fourth vibration frequency to remind the user to stop rotating the electronic apparatus 100 in a more intense manner, thereby avoiding damaging the electronic apparatus and protect the electronic apparatus.

Figure 9:
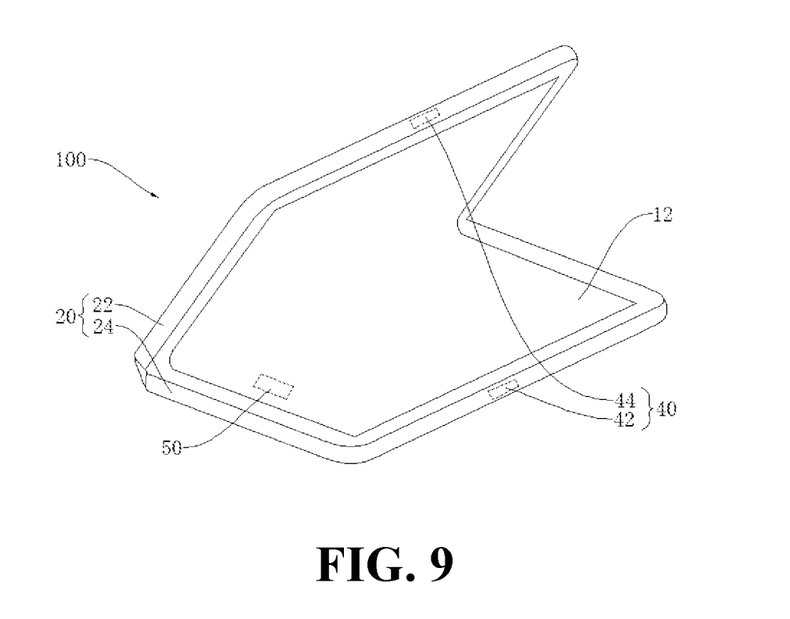
FIG. 9 is a schematic view of an electronic apparatus according to a second embodiment of the present disclosure, illustrating the electronic apparatus being in the process of rotation.
Figure 10:
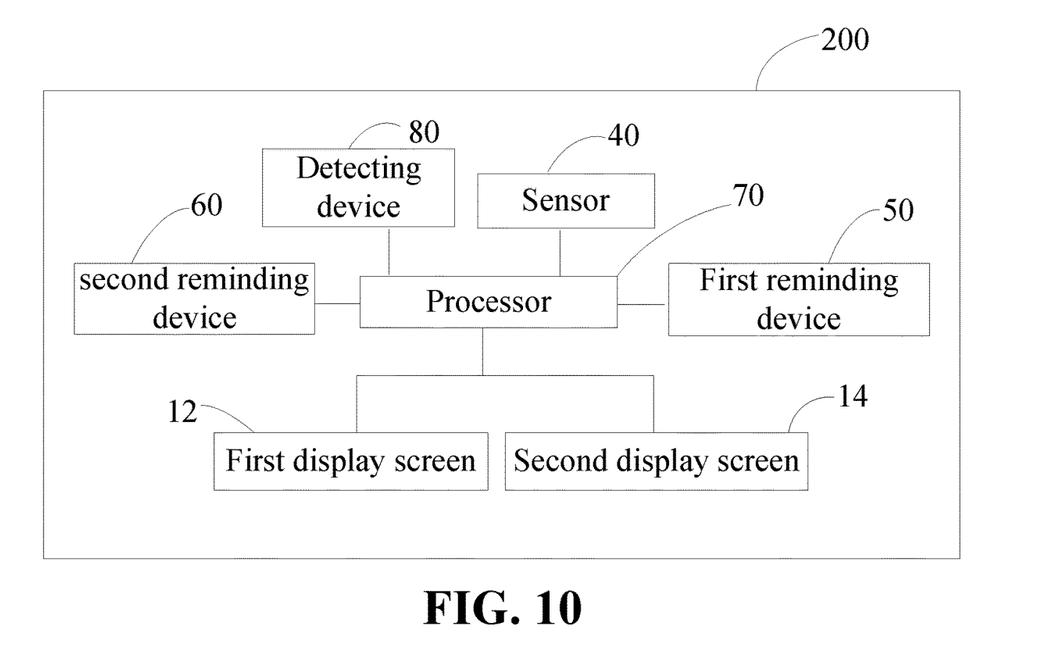
FIG. 10 is a schematic block diagram of an electronic apparatus according to a second embodiment of the present disclosure.

As illustrated in FIG. 9 and FIG. 10, an electronic apparatus 200 provided in a second embodiment of the present disclosure is different from the electronic apparatus 100 provided in the first embodiment in that the electronic apparatus 200 further includes a second reminding device 60 and a detecting device 80 disposed at the casing 20. The second reminding device 60 and the detecting device 80 are electrically coupled to the processor 70. The second reminding device 60 may be a sounding device configured to remind the user that the electronic apparatus 200 has been rotated in place by sounds. The detecting device 80 is configured to detect an ambient volume. The detecting device 80 may be a device for detecting the decibel of the ambient volume. When the actual angle is equal to the target angle, the second reminding device 60 is configured to output a second reminding information.

In one embodiment, the second reminding device 60 may be a speaker of the electronic apparatus 200, that is, the speaker has a function of an alarm at the same time. In one embodiment, when the actual angle is equal to the first angle or the second angle, the second reminding device 60 may output a sound in the same manner. In other embodiments, when the actual angle is equal to the first angle or the second angle, the second reminding device 60 may sound in a different manner. The second reminding device 60 cooperates with the first reminding device 50 to remind the user that the electronic apparatus 200 has been rotated in place, which optimizes the interaction between the electronic apparatus 200 and the user, improves the user experience, and avoids the user excessively rotating the electronic apparatus 200 to damage the electronic apparatus 200, and prolongs the life of the electronic apparatus 200.

When the ambient volume is higher than a threshold, the second reminding device 60 is configured to output a sound at a first volume. When the ambient volume is lower than the threshold, the second reminding device 60 is configured to output a sound at the second volume. In the embodiment, the first volume is higher than the second volume. The processor 70 is configured to control the volume of the sound made by the sounding device. When the ambient volume is high, the sounding device sounds at a high volume to prevent the ambient sound from covering the second reminding information. When the ambient volume is low, the sounding device sounds at a low volume to save power and avoid damaging the user due to an excessive volume.

Figure 11:
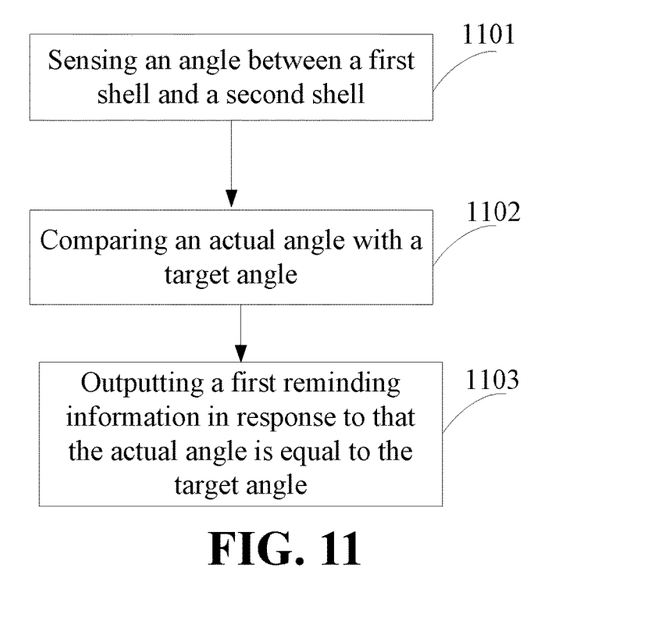
FIG. 11 is a flowchart of a method for controlling an electronic apparatus according to an embodiment of the present disclosure.

As illustrated in FIG. 11, a method for controlling an electronic apparatus according to an embodiment of the present disclosure is provided. The electronic apparatus includes a casing 20 including a first shell 22 and a second shell 24. The first shell 22 is rotatably attached to the second shell 24 through a rotating device 30. The electronic apparatus further includes a first display screen 12, a second display screen 14, a sensor 40, a first reminding device 50, and a processor 70. The first reminding device 50 may be a vibrating device configured to remind a user that the electronic apparatus has been rotated in place by vibrating. The processor 70 may be electronic components such as a chip integrated on a main board of the electronic apparatus. The sensor 40, the first display screen 12, the second display screen 14, the processor 70, and the first reminding device 50 are electrically coupled. The electronic apparatus includes at least two operating states, that is, a folded or collapsed state, and an unfolded or expanded state. The method includes operations at following blocks.

At block 1101, an actual angle defined between the first shell 22 and the second shell 24 is sensed.

In the embodiment, the sensor 40 is configured to sense the actual angle between the first shell 22 and the second shell 24. As illustrated in FIGS. 4 and 8, the sensor 40 is disposed at the casing 20 and configured to sense the actual angle between the first shell 22 and the second shell 24. The sensor 40 is disposed at the first shell 22 and the second shell 24, and configured to determine the actual angle defined between the first shell 22 and the second shell 24 by detecting a positional relationship between the first shell 22 and the second shell 24.

Figure 7:
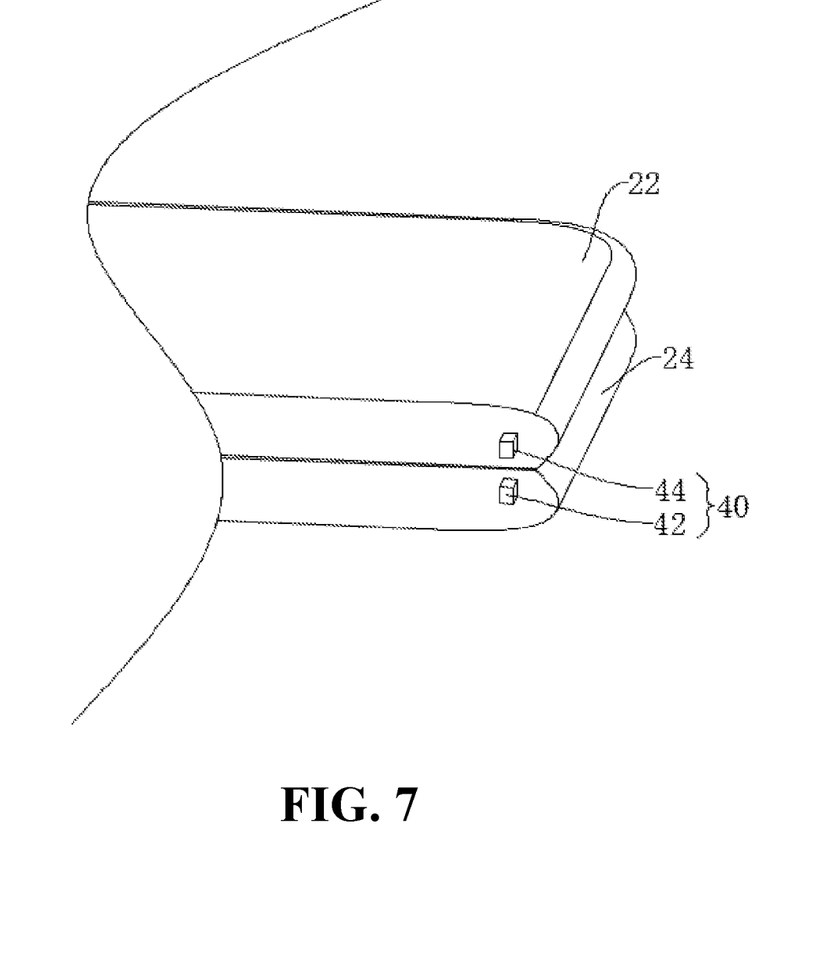
FIG. 7 is a partial schematic structural view of an electronic apparatus according to a first embodiment of the present disclosure.

As illustrated in FIG. 7, in one embodiment, the sensor 40 is a distance sensor and includes a transmitting module 42 and a receiving module 44. The transmitting module 42 is disposed at the first shell 22 and the receiving module 44 is disposed at the second shell 24. The transmitting module 42 is configured to emit infrared rays or ultrasonic waves. The receiving module 44 is configured to receive infrared rays or ultrasonic waves emitted by the transmitting module 42. The processor 70 may calculate the actual angle defined between the first shell 22 and the second shell 24 according to a time from transmitting the infrared rays or ultrasonic waves by the transmitting module 44 to receiving the infrared rays or ultrasonic waves by the receiving module 44 by the time-of-flight method.

At block 1102, the actual angle is compared with a target angle.

In the embodiment, the processor 70 compares the actual angle with the target angle. The target angle includes a first angle defined between the first shell 22 and the second shell 24 when the first shell 22 is unfolded relative to the second shell 24, and a second angle defined between the first shell 22 and the second shell 24 when the first shell 22 and the second shell 24 overlap with each other. In one embodiment, the first angle may be 180° corresponding to the unfolded state of the electronic apparatus and the second target angle may be 0° corresponding to the folded state of the electronic apparatus. The target angle may be preset corresponding to the states of the electronic apparatus by the user, to remind the user that the electronic apparatus enters the corresponding state.

The target angle may set to be a range of a value for reducing an impact of an error of the actual angle sensed by the sensor 40.

In the embodiment, the target angle may be set to any value. In one embodiment, the target angle includes a first angle and a second angle. The first angle is set to 180° and the second angle may be set to 0°. The electronic apparatus 100 includes at least two operating states, that is, a folded state, and an unfolded or state. As illustrated in FIG. 2 and FIG. 5, when the electronic apparatus is in the unfolded state, that is, when the first shell 22 is rotated unfolded relative to the second shell 24, the actual angle between the first shell 22 and the second shell 24 is 180°. At this time, the first display screen 12 displays for the electronic apparatus 100 and the target angle may be set to 180°. The user unfolds the electronic apparatus to cause the actual angle between the first shell 22 and the second shell 24 to be 180°, that is, equal to the first angle.

As illustrated in FIG. 3 and FIG. 6, when the electronic apparatus is in the folded state, that is, when the first shell 22 overlap with the second shell 24, the actual angle between the first shell 22 and the second shell 24 is 0°. At this time, the second display screen 14 displays for the electronic apparatus 100 and the target angle is set to 0°. The user folds the electronic apparatus 100 to cause the actual angle between the first shell 22 and the second shell 24 to be 0°, that is, equals to the second angle.

At block 1103, when the actual angle is equal to the target angle, a first reminding information is output.

In the embodiment, the first reminding device 50 is configured to output the first reminding information. As illustrated in FIG. 4 and FIG. 8, the first reminding device 50 is disposed at the casing 20. When the actual angle defined between the first shell 22 and the second shell 24 is equal to the target angle, the first reminding device 50 outputs the first reminding information.

The number of the first reminding devices 50 may be one or more. When the number of the first reminding devices 50 is one, the first reminding device 50 is disposed at the first shell 22 or the second shell 24. When the number of the first reminding devices 50 is multiple, all the first reminding device 50 may be disposed at the first shell 22 or the second shell 24, or some first reminding devices 50 may be disposed at the first shell 22 and some first reminding devices 50 may be disposed at the second shell 24.

The first reminding device 50 may be a linear motor which drives a slider to reciprocate on a slide rail to generate the vibration with a good vibration effect.

After the sensor 40 senses the actual angle between the first shell 22 and the second shell 24, the processor 70 compares the actual angle with the target angle. When the actual angle is equal to the target angle, the processor 70 controls the first reminding device 50 to vibrate. When the actual angle is not equal to the target angle, the first reminding device 50 does not vibrate. The target angle may be preset by the user corresponding to the operating states of the electronic apparatus 100 to remind the user that the electronic apparatus 100 enters the corresponding operating state. The target angle may also be a value set by the user according to his/her personal preference and habits. Alternatively, the target angle may also set to be a range of a value to reduce an impact of an error of the actual angle sensed by the sensor 40. Alternatively, in other embodiments, the first reminding device 50 may also be a sounding device or a light emitting device and the first reminding information may be a sound or a light.

In the embodiment, the target angle may be set to any value. In one embodiment, the target angle includes a first angle and a second angle. The first angle is set to 180° and the second angle may be set to 0°. The electronic apparatus 100 includes at least two operating states, that is, a folded state, and an unfolded or state. As illustrated in FIG. 2 and FIG. 5, when the electronic apparatus 100 is in the unfolded state, that is, when the first shell 22 is unfolded relative to the second shell 24, the actual angle between the first shell 22 and the second shell 24 is 180°, the first display screen 12 displays for the electronic apparatus 100 and the target angle may be set to 180°. When the user unfolds the electronic apparatus 100 to cause the actual angle between the first shell 22 and the second shell 24 to be 180°, that is, equal to the first angle, the first reminding device 50 outputs a first reminding information to remind the user that the electronic apparatus 100 is in the unfolded state.

As illustrated in FIG. 3 and FIG. 6, when the electronic apparatus 100 is in the folded state, that is, when the first shell 22 is folded relative to the second shell 24, the actual angle defined between the first shell 22 and the second shell 24 is 0°, the second display screen 14 displays for the electronic apparatus 100 and the target angle is set to 0°. When the user folds the electronic apparatus 100 to cause the actual angle between the first shell 22 and the second shell 24 to be 0°, that is, equals to the second angle, the first reminding device 50 outputs the first reminding information to remind the user that the electronic apparatus is in the folded state. In the embodiment, when the actual angle is equal to the first angle or the second angle, the first reminding device 50 may remind the user in the same or a different manner. For example, when the actual angle is equal to the first angle or the second angle, the first reminding device 50 may vibrate at the same or different vibration frequency, or with the same or different vibration amplitude.

When the actual angle defined between the first shell 22 and the second shell 24 equals to the target angle (e.g., 0° or 180°), the first reminding device 50 outputs the first reminding information to remind the user that the electronic apparatus is rotated in place, which optimizes the interaction between the electronic apparatus and the user, improves the user experience, and avoids the user excessively rotating the electronic apparatus to damage the electronic apparatus, and prolongs the life of the electronic apparatus.

In the embodiment, the first display screen 12 includes a first portion 122 and a second portion 124. The first display screen 12 is a flexible display screen. As illustrated in FIG. 5, the first shell 22 includes a first surface 22a and a second surface 22b opposite the first surface 22a. The second shell 24 includes a first surface 24a and a second surface opposite the first surface 24a. The first portion 122 is disposed at the first surface 22a of the first shell 22 and the second portion 124 is disposed at the first surface 24a of the second shell 24. The second display screen 14 is disposed at the first shell 22. In the embodiment, the second display screen 14 is disposed at the second surface 22b of the first shell 22.

In this embodiment, the method for controlling the electronic apparatus further includes the following operations. When the actual angle is 180°, the first display screen 12 displays information and the second display screen 14 is turned off. When the actual angle is 0°, the second display screen 14 displays information and the first display screen 12 is turned off.

When the actual angle is 180°, that is, the actual angle is equal to the first angle, the processor 70 controls the first display screen 12 to displays information and the second display screen 14 to be turned off. When the actual angle is 0°, that is, the actual angle is equal to the second angle, the processor 70 controls the second display screen 14 to display information and the first display screen 12 to be turned off. When the actual angle is equal to the first angle, that is, when the electronic apparatus is in the unfolded state, the first display screen 12 displays for the electronic apparatus and the second display screen 14 is turned off to save power. When the actual angle is equal to the second angle, that is, when the electronic apparatus is in the folded state, that is, the second display 14 displays for the electronic apparatus and the first display 12 is turned off to save power.

In one embodiment, when the actual angle is equal to the target angle, the method for controlling the electronic apparatus further includes the following operations.

A battery capacity of the electronic apparatus is detected.

When the battery capacity is higher than a threshold, the first reminding information vibrating with a first vibration amplitude is output.

When the battery capacity is lower than the threshold, the first reminding information vibrating with a second vibration amplitude is output. The first vibration amplitude is greater than the second vibration amplitude.

When the actual angle defined between the first shell 22 and the second shell 24 is equal to the target angle, the method further includes the following operations. The processor 70 detects the battery capacity of the electronic apparatus. When the battery capacity is higher than the threshold, the first reminding device 50 vibrates with the first vibration amplitude. When the remaining charge is less than the threshold, the first reminding device 50 vibrates with the second vibration amplitude. The first vibration amplitude is greater than the second vibration amplitude. The power consumed by the vibrating device vibrating with the first vibration amplitude is greater than the power consumed by the vibrating device vibrating with the second vibration amplitude vibration. When the power of the electronic apparatus is sufficient, the vibrating device vibrates with a large vibration amplitude to obtain a better reminding effect. When the power of the electronic apparatus is insufficient, the vibrating device vibrates with a small vibration amplitude to save power and extend standby time.

When the battery capacity is higher than the threshold, the first reminding information being a vibration at a first vibration frequency is output.

When the battery capacity is lower than the threshold, the first reminding information being a vibration at a second vibration frequency is output. The first vibration frequency is greater than the second vibration frequency.

When the battery capacity is higher than the threshold, the first reminding device 50 vibrates at the first vibration frequency, and when the battery capacity is lower than the threshold, the first reminding device 50 vibrates at a second vibration frequency. The first vibration frequency is greater than the second vibration frequency. The power consumed by the vibrating device vibrating at the first vibration frequency is greater than the power consumed by the vibrating device vibrating at the second vibration frequency. When the power of the electronic apparatus is sufficient, the vibrating device vibrates at a relatively high vibration frequency to obtain a better reminding effect. When the power of the electronic apparatus is insufficient, the vibrating device vibrates at a smaller vibration frequency to save power and extend standby time.

In one embodiment, the method for controlling the electronic apparatus further includes the following operations.

When the actual angle is equal to the first angle or the second angle, the first reminding information being a vibration at a third vibration amplitude is output.

When the actual angle is greater than the first angle or less than the second angle, the first reminding information vibrating with a fourth vibration amplitude is output. The third vibration amplitude is smaller than the fourth amplitude.

When the actual angle is equal to the first angle or the second angle, the processor 70 is configured to control the first reminding device 50 to vibrate with the third vibration amplitude. When the actual angle is greater than the first angle or less than the second angle, the processor 70 is configured to control the first reminding device 50 to vibrate with the fourth vibration amplitude. The third vibration amplitude is less than the fourth vibration amplitude. The first reminding device 50 may generate a stronger vibration, that is, a stronger reminding, vibrating with the fourth vibration amplitude than the third vibration amplitude. Specific application scenarios include, but are not limited to, the following. The user rotates the first shell 22 and the second shell 24 to unfold the electronic apparatus and the first display screen 12 may display information. When the actual angle equals the first angle (i.e., 180°), the first reminding device 50 vibrates with the third vibration amplitude to remind the user that the electronic apparatus 100 has rotated 180° to be in the unfolded state. When the user continues to forcefully rotate the electronic apparatus to cause the actual angle to be greater than 180°, the first reminding device 50 vibrates with the fourth vibration amplitude to remind the user to stop rotating the electronic apparatus in a more intense manner thereby avoiding damaging the electronic apparatus and protect the electronic apparatus.

When the actual angle is equal to the first angle or the second angle, the first reminding information being a vibration at a third vibration frequency is output.

When the actual angle is greater than the first angle or less than the second angle, the first reminding information of a vibration at a fourth vibration frequency is output. The third vibration frequency is less than the fourth vibration frequency.

When the actual angle is equal to the first angle or the second angle, the processor 70 is configured to control the first reminding information 50 to vibrate at the third vibration frequency. When the actual angle is greater than the first angle or less than the second angle, the processor is configured to control the first reminding information 50 to vibrate at the fourth vibration frequency. The first reminding device 50 may generate a stronger vibration, that is, a stronger reminding effect, vibrating at the fourth vibration frequency than the third vibration frequency. Specific application scenarios include, but are not limited to, the following. The user rotates the first shell 22 and the second shell 24 to unfold the electronic apparatus and the first display screen 12 may display information. When the actual angle equal to the first angle (i.e., 180°), the first reminding device 50 vibrates at the third vibration frequency to remind the user that the electronic apparatus 100 has rotated 180° to be in the unfolded state. When the electronic apparatus is further forcefully rotated to cause the actual angle to be greater than 180°, the first reminding device 50 vibrates with the fourth vibration amplitude to remind the user to stop rotating the electronic apparatus in a more intense manner, thereby avoiding damaging the electronic apparatus and protect the electronic apparatus.

In one embodiment, when the actual angle is equal to the target angle, the method for controlling the electronic apparatus further includes the following operations.

An ambient volume is detected.

When the ambient volume is higher than a threshold, a second reminding information being a sound at a first volume is output.

When the ambient volume is lower than the threshold, the second reminding information being a sound at a second volume is output. The first volume is greater than the second volume.

The electronic apparatus further includes a second reminding device 60 and a detecting device 80. The second reminding device 60 and the detecting device 80 are electrically coupled to the processor 70. The second reminding device 60 may be a sounding device configured to remind the user that the electronic apparatus 200 has been rotated in place by sounds. The detecting device 80 is configured to detect an ambient volume. In the embodiment, the detecting device 80 may be a device for detecting the decibel of the ambient volume. The reminding device 60 is disposed at the casing 20. When the actual angle is equal to the target angle, the second reminding device 60 outputs a second reminding information. The second reminding device 60 may be a sounding device, that is, the second reminding device 60 may remind the user that the electronic apparatus has been rotated in place by sounds. In one embodiment, the second reminding device 60 may be a speaker of the electronic apparatus, that is, the speaker has a function of an alarm at the same time. In one embodiment, when the actual angle is equal to the first angle or the second angle, the second reminding device 60 outputs sounds in the same manner. In other embodiments, when the actual angle is equal to the first angle or the second angle, the second reminding device 60 outputs sounds in a different manner. The second reminding device 60 cooperates with the first reminding device 50 to remind the user that the electronic apparatus has been rotated in place, which optimizes the interaction between the electronic apparatus and the user, improves the user experience, and avoids the user excessively rotating the electronic apparatus to damage the electronic apparatus, and prolongs the life of the electronic apparatus.

When the ambient volume detected by the detecting device 80 is higher than a threshold, the second reminding device 60 outputs sounds at a first volume. When the ambient volume is lower the threshold, the second reminding device 60 outputs sounds at a second volume. In this embodiment, the first volume is greater than the second volume. The processor 70 may control the volume of the sound output by the second reminding device 60. When the ambient volume is high, the second reminding device 60 outputs sounds at a high volume to prevent the ambient sound from covering the second reminding information. When the ambient volume is low, the second reminding device 60 outputs sounds at a low volume to save power and avoid damaging the user due to an excessive volume.

Those skilled in the art should understand that all or part of the operations of the foregoing embodiments may be completed by a program to instruct related hardware. The program may also be stored in a computer readable storage medium. The storage medium may include only read-only memory (ROM), random access memory (RAM), programmable read-only memory (PROM), erasable programmable read-only memory (EPROM), one-time programmable Read-Only memory (OTPROM), electrically erasable rewritable read-only memory (EEPROM), compact disc read-only memory (CD-ROM), or other optical disc storage, disk storage, magnetic tape storage, or any other medium readable by a computer that may be used to carry or store data. It should be understood that, terms "first" and "second" are used for descriptive purposes only and are not to be construed as indicating or implying a relative importance or implicitly indicating the number of technical features indicated. Thus, features defined by the terms "first" or "second" may explicitly or implicitly include one or more of the described features. In the description of the embodiments of the present disclosure, terms "a plurality" or "a number of" mean two or more unless specifically and specifically defined otherwise.

In the description of the embodiments of the present application, it should be noted that terms "install", "connect", and "couple" should be understood broadly, and may be a fixed connection, a detachable or integrally connection, a mechanical connection, electrically connection or communicatively coupling, a directly connection or indirectly connection through an intermediate medium, or an internal connection of two components or interaction relationship between two components. For those skilled in the art, the specific meanings of the above terms in the embodiments of the present disclosure may be understood case by case.

In the description of the present specification, descriptions with reference to terms "one embodiment", "some embodiments", "illustrative embodiment", "example", "specific example", "some examples", or the like mean that the specific features, structures, materials, or characteristics described in connection with the embodiments or examples are included in at least one embodiment or example of the present disclosure. In the present specification, the schematic description of the above terms does not necessarily mean the same embodiment or example. Furthermore, the specific features, structures, materials, or characteristics described may be combined in a suitable manner in anyone or more embodiments or examples.

The embodiments of the present disclosure have been described above. It should be noted that some modifications and improvements may be made by those skilled in the art within the spirit and principle of the above embodiments and those modifications and improvement should be included within the protection scope of the present disclosure.

What is claimed is:

1. An electronic apparatus, comprising:
   a casing comprising a first shell and a second shell rotatably connected to the first shell;
   a sensor configured to sense an actual angle defined between the first shell and the second shell;
   a first reminding device; and
   a processor electrically coupled to the sensor and the first reminding device, and configured to control, in response to that the actual angle equals a target angle, the first reminding device to output a first reminding information to remind that the electronic apparatus enters an operating state corresponding to the target angle.

2. The electronic apparatus of claim 1, wherein the sensor is a distance sensor, wherein the distance sensor comprises a transmitting module disposed at the first shell and a receiving module disposed at the second shell.

3. The electronic apparatus of claim 2, wherein the first reminding device is a vibrating device.

4. The electronic apparatus of claim 3, wherein the processor is further configured to detect a remaining battery capacity of the electronic apparatus, and to control, in response to that the remaining battery capacity is higher than a threshold, the first reminding device to vibrate with a first vibration amplitude to output the first reminding information, and to control, in response to that the remaining battery capacity is lower than the threshold, the first reminding device to vibrate with a second vibration amplitude to output the first reminding information, wherein the first vibration amplitude is greater than the second vibration amplitude.

5. The electronic apparatus of claim 3, wherein the processor is further configured to detect a remaining battery capacity of the electronic apparatus, and to control, in response to that the remaining battery capacity is higher than a threshold, the first reminding device to vibrate at a first vibration frequency to output the first reminding information, and to control, in response to that the remaining battery capacity is lower than the threshold, the first reminding device to vibrate a second vibration frequency to output the first reminding information, wherein the first vibration frequency is greater than the second vibration frequency.

6. The electronic apparatus of claim 3, wherein the target angle comprises a first angle defined between the first shell and the second shell when the first shell is unfolded relative to the second shell and a second angle defined between the first shell and the second shell when the first shell and the second shell overlap with each other,
the processor is configured to control, in response to that the actual angle equals the target angle, the first reminding device to vibrate with a first vibration amplitude to output the first reminding information, and to control, in response to that the actual angle is larger than the first angle or smaller than the second angle, the first reminding device to vibrate with a second vibration amplitude, wherein the first vibration amplitude is less than the second vibration amplitude.

7. The electronic apparatus of claim 3, wherein the target angle comprises a first angle defined between the first shell and the second shell when the first shell is unfolded relative to the second shell and a second angle defined between the first shell and the second shell when the first shell and the second shell overlap with each other; and
the processor is further configured to control, in response to that the actual angle is equal to the first angle or the second angle, the first reminding device to vibrate at a first vibration frequency to output the first reminding information, and to control, in response to that the actual angle is greater than the first angle or less than the second angle, the first reminding device to vibrate at a second vibration frequency, wherein the first vibration frequency is less than the second vibration frequency.

8. The electronic apparatus of claim 1, further comprising a second reminding device, wherein the processor is further configured to control, in response to that the actual angle is equal to the target angle, the second reminding device to output a second reminding information.

9. The electronic apparatus of claim 8, wherein the second reminding device is a sounding device;
the electronic apparatus further comprises a detecting device configured to detect an ambient volume;
the processor is configured to control, in response to that the ambient volume is higher than a threshold, the second reminding device to output sounds at a first volume to output the second reminding information, and the processor is further configured to control, in response to that the ambient volume is lower than the threshold, the second reminding device to output sounds at a second volume to output the second reminding information, wherein the first volume is higher than the second volume.

10. The electronic apparatus of claim 1, further comprising a first display screen and a second display screen, wherein the first display screen comprises a first portion and a second portion;
the first shell has a first surface and a second surface opposite the first surface;
the first portion is disposed at the first surface of the first shell and the second display screen is disposed at the second surface of the first shell, and the second portion is disposed at the second shell; and
the first portion and the second portion are located at the same side of the casing when the first shell is unfolded relative to the second shell, and the first display screen is located between the first shell and the second shell and the first portion faces the second portion when the first shell and the second shell overlap with each other.

11. The electronic apparatus of claim 10, wherein the target angle comprises 180° and 0°; and
the processor is configured to control, in response to that the actual angle equals 180°, the first display screen to be turned on and the second display screen to be turned off; the processor is further configured to control, in response to that the actual angle equals 0°, the first display screen to be turned off and the second display screen to be turned on.

12. An electronic apparatus, comprising:
a first shell;
a second shell;
a sensor;
a reminding device; and
a processor electrically coupled to the sensor and the reminding device, configured to determine a current state of the electronic apparatus according to sensing data from the sensor, and to output a reminding information to remind that the electronic apparatus enters an operating state corresponding to a target angle through the reminding device in response to that the current state of the electronic apparatus is one of a first state and a second state, in the first state the first shell and the second shell being unfolded relative to the second shell and in the second state the first shell overlapping with each other.

13. A method for controlling an electronic apparatus, the electronic apparatus comprising a casing, the casing comprising a first shell and a second shell rotatably attached to the first shell, the method comprising:
sensing an actual angle defined between the first shell and the second shell;
comparing the actual angle with a target angle; and
outputting a first reminding information to remind that the electronic apparatus enters an operating state corresponding to the target angle in response to that the actual angle is equal to the target angle.

14. The method of claim 13, further comprising:
in response to that the actual angle equals the target angle:
detecting a remaining battery capacity of the electronic apparatus;
outputting the first reminding information in response to that the remaining battery capacity is higher than a threshold; the first reminding information being a vibration with a first vibration amplitude; and outputting the first reminding information in response to that the remaining battery capacity is lower than the threshold; the first reminding information being a vibration with a second vibration amplitude, wherein the first vibration amplitude is greater than the second vibration amplitude.

15. The method of claim 13, further comprising:
in response to that the actual angle equals the target angle:
detecting a remaining battery capacity of the electronic apparatus;
outputting the first reminding information in response to that the remaining battery capacity is higher than a threshold; the first reminding information being a vibration at a first vibration frequency; and
outputting the first reminding information in response to that the remaining battery capacity is lower than the threshold; the first reminding information being a vibration at a second vibration frequency, wherein the first vibration frequency is greater than the second vibration frequency.

16. The method of claim 13, wherein the target angle comprises a first angle defined between the first shell and the second shell when the first shell is unfolded relative to the second shell and a second angle defined between the first shell and the second shell when the first shell and the second shell overlap with each other; the first reminding information is a vibration with a first vibration amplitude; and
the method further comprises:
outputting a second reminding information in response to that the actual angle is greater than the first angle or less than the second angle, the second reminding information being a vibration with a second vibration amplitude, and the first vibration amplitude being less than the second vibration amplitude.

17. The method of claim 13, wherein:
the target angle comprises a first angle defined between the first shell and the second shell when the first shell is unfolded relative to the second shell and a second angle defined between the first shell and the second shell when the first shell and the second shell overlap with each other;
the first reminding information is a vibration at a first vibration frequency; and
the method further comprises:
outputting a second reminding information in response to that the actual angle is greater than the first angle or less than the second angle; the second reminding information being a vibration at a second vibration frequency; wherein the first vibration frequency is less than the second frequency.

18. The method of claim 13, further comprising:
outputting a second reminding information in response to that the actual angle is equal to the target angle.

19. The method of claim 18, further comprising:
in response to that the actual angle equals the target angle:
detecting an ambient volume;
outputting the second reminding information in response to that the ambient volume is higher than a threshold; the second reminding information being a sound at a first volume; and
outputting the second reminding information in response to that the ambient volume is lower than the threshold; the second reminding information being a sound at a second volume, wherein first volume is higher than the second volume.

20. The method of claim 13, wherein the electronic apparatus further comprises a first display screen and a second display screen, wherein the first display screen comprises a first portion and a second portion; the first display screen is a flexible display screen; the first shell has a first surface and a second surface opposite the first surface; the first portion is disposed at the first surface of the first shell, the second portion is disposed at the second shell, and the second display screen is disposed at the second surface of the first shell; and
the method further comprises:
turning on the first display screen and turning off the second display screen in response to that the actual angle is 180°; and
turning on the second display screen and turning off the first display screen in response to that the actual angle is 0°.

* * * * *